(12) United States Patent
Shakkarwar

(10) Patent No.: US 10,915,880 B2
(45) Date of Patent: *Feb. 9, 2021

(54) SYSTEM AND METHOD FOR DISTRIBUTED PAYMENT PRODUCTS

(71) Applicant: Verient Inc., San Jose, CA (US)

(72) Inventor: Rajesh G. Shakkarwar, Mountain View, CA (US)

(73) Assignee: Verient Inc., San Jose, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/960,223

(22) Filed: Apr. 23, 2018

(65) Prior Publication Data

US 2018/0240105 A1 Aug. 23, 2018

Related U.S. Application Data

(63) Continuation of application No. 12/887,347, filed on Sep. 21, 2010, now Pat. No. 9,953,313, which is a
(Continued)

(51) Int. Cl.
*G06Q 30/00* (2012.01)
*G06Q 20/22* (2012.01)
(Continued)

(52) U.S. Cl.
CPC ......... *G06Q 20/2295* (2020.05); *G06Q 20/04* (2013.01); *G06Q 20/10* (2013.01);
(Continued)

(58) Field of Classification Search
CPC ................................................ G06Q 20/35785
(Continued)

(56) References Cited

U.S. PATENT DOCUMENTS 5,884,271 A 3/1999 Pitroda
5,953,710 A 9/1999 Fleming
(Continued)

FOREIGN PATENT DOCUMENTS

EP 1 383 073 A1 1/2004
EP 1383079 A2 1/2004
(Continued)

OTHER PUBLICATIONS

NPL Search History.*
(Continued)

*Primary Examiner* — John H. Holly
(74) *Attorney, Agent, or Firm* — Artegis Law Group, LLP

(57) ABSTRACT

A method for generating and distributing a plurality of financial child products to a group of recipients that can then be used for payment transactions by each recipient. The method includes receiving a selection of a core account that provides financial backing for the financial child products, and receiving a list of recipients that defines the group of recipients to which the financial child products are distributed. The method further includes generating the financial child products, where each financial child product is structured with one or more control parameters that define user restrictions for the financial child product, and causing the financial child products to be distributed to at least one recipient included in the list of recipients. Advantageously, since creating, distributing, and redeeming of the financial child products is performed using existing legacy networks, financial institutions only need to minimally modify legacy payment processing infrastructure to support these distributed payment products.

20 Claims, 10 Drawing Sheets

Related U.S. Application Data continuation-in-part of application No. 12/118,647, filed on May 9, 2008, now abandoned.

(60) Provisional application No. 61/245,213, filed on Sep. 23, 2009.

(51) Int. Cl.
*G06Q 20/04* (2012.01)
*G06Q 20/10* (2012.01)
*G06Q 20/34* (2012.01)
*G06Q 30/02* (2012.01)
*G06Q 30/06* (2012.01)
*G06Q 40/02* (2012.01)

(52) U.S. Cl.
CPC ......... *G06Q 20/105* (2013.01); *G06Q 20/227* (2013.01); *G06Q 20/355* (2013.01); *G06Q 20/3572* (2013.01); *G06Q 30/02* (2013.01); *G06Q 30/0235* (2013.01); *G06Q 30/06* (2013.01); *G06Q 40/02* (2013.01)

(58) Field of Classification Search
USPC ................ 705/35, 1.1, 2, 40, 41, 67, 39, 75; 235/280, 383
See application file for complete search history.

(56) References Cited

U.S. PATENT DOCUMENTS

| | | | |
|---|---|---|---|
| 6,101,486 | A | 8/2000 | Roberts et al. |
| 6,311,194 | B1 | 10/2001 | Sheth et al. |
| 6,973,625 | B1 | 12/2005 | Lupo et al. |
| 6,973,627 | B1 | 12/2005 | Appling |
| 6,993,712 | B2 | 1/2006 | Ramachandran et al. |
| 7,104,440 | B2 | 9/2006 | Hansen et al. |
| 7,177,836 | B1 | 2/2007 | German et al. |
| 7,225,156 | B2 | 5/2007 | Fisher et al. |
| 7,284,126 | B2 | 10/2007 | Engel |
| 7,546,945 | B1 | 6/2009 | Bucci et al. |
| 7,548,890 | B2 | 6/2009 | Shakkarwar |
| 7,567,934 | B2 | 7/2009 | Flitcroft et al. |
| 7,571,142 | B1 | 8/2009 | Flitcroft et al. |
| 7,593,896 | B1 | 9/2009 | Flitcroft et al. |
| 7,640,512 | B1 | 12/2009 | Appling |
| 7,665,657 | B2 | 2/2010 | Huh |
| 7,761,370 | B1 | 7/2010 | Hicks et al. |
| 7,769,688 | B1 | 8/2010 | Bent et al. |
| 7,881,999 | B2 | 2/2011 | Bagheri |
| 7,882,203 | B2 | 2/2011 | Sasnett et al. |
| 7,904,385 | B2 | 3/2011 | Bishop et al. |
| 7,912,917 | B2 | 3/2011 | Chakra et al. |
| 7,941,367 | B2 | 5/2011 | Bishop et al. |
| 7,941,372 | B2 | 5/2011 | Bishop et al. |
| 7,953,671 | B2 | 5/2011 | Bishop et al. |
| 7,962,408 | B2 | 6/2011 | Bishop et al. |
| 7,983,987 | B2 | 7/2011 | Kranzley et al. |
| 8,019,664 | B1 | 9/2011 | Tifford et al. |
| 8,020,763 | B1 | 9/2011 | Kowalchyk et al. |
| 8,024,267 | B2 | 9/2011 | Olliphant et al. |
| 8,028,041 | B2 | 9/2011 | Olliphant et al. |
| 8,032,456 | B1 | 10/2011 | Bent et al. |
| 8,065,610 | B2 | 11/2011 | Xu et al. |
| 8,073,895 | B2 | 12/2011 | Hamzeh et al. |
| 8,121,941 | B2 | 2/2012 | Matthews et al. |
| 8,260,705 | B1 | 9/2012 | Bent et al. |
| 8,311,939 | B1 | 11/2012 | Bent et al. |
| 8,417,601 | B1 | 4/2013 | Simons |
| 8,606,702 | B2 | 12/2013 | Ruckart |
| 8,676,708 | B1 | 3/2014 | Honey |
| 8,688,577 | B1 | 4/2014 | Bent et al. |
| 8,689,012 | B1 | 4/2014 | Bierbaum et al. |
| 8,751,376 | B1 | 6/2014 | Wilkes |
| 8,781,931 | B1 | 7/2014 | Bent et al. |
| 8,793,164 | B2 | 7/2014 | Sendo et al. |
| 8,881,975 | B1 | 11/2014 | Matthews |
| 9,424,603 | B2 | 8/2016 | Hammad et al. |
| 2001/0001856 | A1* | 5/2001 | Gould ............. G06Q 20/363 705/39 |
| 2001/0034720 | A1 | 10/2001 | Armes |
| 2002/0022966 | A1 | 2/2002 | Horgan |
| 2002/0055907 | A1 | 5/2002 | Pater et al. |
| 2002/0077978 | A1 | 6/2002 | O'Leary et al. |
| 2002/0087427 | A1 | 7/2002 | Ganesan et al. |
| 2002/0087469 | A1 | 7/2002 | Ganesan et al. |
| 2002/0095386 | A1 | 7/2002 | Matzen et al. |
| 2002/0111886 | A1 | 8/2002 | Chenevich et al. |
| 2002/0198806 | A1 | 12/2002 | Blagg et al. |
| 2003/0191711 | A1 | 10/2003 | Jamison et al. |
| 2004/0039694 | A1 | 2/2004 | Dunn et al. |
| 2004/0139004 | A1 | 7/2004 | Cohen et al. |
| 2004/0158522 | A1 | 8/2004 | Brown et al. |
| 2004/0205593 | A1 | 10/2004 | Kraemer |
| 2004/0230495 | A1 | 11/2004 | Lotvin et al. |
| 2005/0004909 | A1 | 1/2005 | Stevenson et al. |
| 2005/0021399 | A1 | 1/2005 | Postrel |
| 2005/0033609 | A1 | 2/2005 | Yang |
| 2005/0102188 | A1 | 5/2005 | Hutchison et al. |
| 2005/0103836 | A1 | 5/2005 | Tolley |
| 2005/0132202 | A1 | 6/2005 | Dillaway et al. |
| 2005/0216354 | A1 | 9/2005 | Bam et al. |
| 2005/0240522 | A1 | 10/2005 | Kranzley et al. |
| 2005/0256747 | A1 | 11/2005 | Hellrigel |
| 2005/0289057 | A1 | 12/2005 | Onizuka |
| 2006/0064320 | A1 | 3/2006 | Postrel |
| 2006/0076400 | A1 | 4/2006 | Fletcher |
| 2006/0165060 | A1 | 7/2006 | Dua |
| 2006/0168096 | A1 | 7/2006 | Hayward et al. |
| 2006/0229959 | A1 | 10/2006 | Heidingsfeld et al. |
| 2007/0017976 | A1 | 1/2007 | Peyret et al. |
| 2007/0083464 | A1 | 4/2007 | Cordero Torres et al. |
| 2007/0192245 | A1 | 8/2007 | Fisher et al. |
| 2007/0255653 | A1 | 11/2007 | Tumminaro et al. |
| 2007/0282739 | A1 | 12/2007 | Thomsen |
| 2008/0021787 | A1 | 1/2008 | MacKouse |
| 2008/0086424 | A1 | 4/2008 | Jambunathan et al. |
| 2008/0120195 | A1 | 5/2008 | Shakkarwar |
| 2008/0120210 | A1 | 5/2008 | Leventhal |
| 2008/0249931 | A1 | 10/2008 | Gilder et al. |
| 2008/0288404 | A1 | 11/2008 | Pirzadeh et al. |
| 2009/0070260 | A1* | 3/2009 | Flitcroft ............... G06Q 20/342 705/41 |
| 2009/0076966 | A1 | 3/2009 | Bishop et al. |
| 2009/0131025 | A1 | 5/2009 | Sharma et al. |
| 2009/0132266 | A1 | 5/2009 | Kao et al. |
| 2009/0150288 | A1 | 6/2009 | Bishop et al. |
| 2009/0228370 | A1 | 9/2009 | Shakkarwar |
| 2009/0234751 | A1 | 9/2009 | Chan et al. |
| 2009/0281944 | A1 | 11/2009 | Shakkarwar |
| 2010/0010909 | A1 | 1/2010 | Marshall et al. |
| 2010/0036761 | A1 | 2/2010 | Gelerman |
| 2010/0037303 | A1 | 2/2010 | Sharif et al. |
| 2010/0063906 | A1 | 3/2010 | Nelsen et al. |
| 2010/0153224 | A1 | 6/2010 | Livnat |
| 2010/0211445 | A1 | 8/2010 | Bodington |
| 2010/0241518 | A1 | 9/2010 | McCann |
| 2010/0251143 | A1 | 9/2010 | Thomas et al. |
| 2010/0268588 | A1 | 10/2010 | Lal et al. |
| 2010/0280956 | A1 | 11/2010 | Chutorash et al. |
| 2011/0010237 | A1 | 1/2011 | Shakkarwar |
| 2011/0106674 | A1 | 5/2011 | Perlman |
| 2011/0106696 | A1 | 5/2011 | Seven |
| 2011/0246374 | A1 | 10/2011 | Franz |
| 2012/0047065 | A1 | 2/2012 | Neff |
| 2012/0066096 | A1 | 3/2012 | Penide |
| 2012/0253852 | A1 | 10/2012 | Pourfallah et al. |
| 2013/0080323 | A1 | 3/2013 | Scipioni |
| 2013/0103560 | A1 | 4/2013 | Stone et al. |
| 2013/0275305 | A1 | 10/2013 | Duplan |
| 2013/0346305 | A1 | 12/2013 | Mendes |
| 2014/0278989 | A1 | 9/2014 | Calman et al. |
| 2014/0279008 | A1 | 9/2014 | Calman et al. |
| 2014/0324627 | A1 | 10/2014 | Haver et al. |

(56) References Cited

U.S. PATENT DOCUMENTS

2015/0058109 A1 2/2015 Lange
2015/0278811 A1 10/2015 Lalchandani et al.
2017/0069028 A1 3/2017 Narayana et al.

FOREIGN PATENT DOCUMENTS

| EP | 2355033 A1 | 8/2011 |
|---|---|---|
| WO | 01/03033 A1 | 1/2001 |
| WO | 2005/017793 A1 | 2/2005 |
| WO | 2007/011791 A2 | 1/2007 |
| WO | 2009/137716 A2 | 11/2009 |

OTHER PUBLICATIONS

Non-Final Rejection received for U.S. Appl. No. 13/011,536, dated Dec. 4, 2013, 65 pages.
"California government doles out more IOUs", USA Today, http://usatoday30.usatoday.com/news/nation/2009-07-07-iou_N.htm, Jul. 7, 2009, 3 pages.
Non-Final Rejection received for U.S. Appl. No. 13/011,536, dated Apr. 3, 2015, 43 pages.
Non-Final Rejection received for U.S. Appl. No. 13/011,536, dated Dec. 30, 2015, 20 pages.
Final Rejection received for U.S. Appl. No. 13/011,536, dated Jun. 30, 2016, 32 pages.
Non-Final Rejection received for U.S. Appl. No. 13/011,536, dated Mar. 29, 2019, 18 pages.
Final Rejection received for U.S. Appl. No. 13/011,536, dated Aug. 26, 2019, 23 pages.
Non-Final Rejection received for U.S. Appl. No. 12/118,647, dated Jun. 18, 2010, 35 pages.
Final Rejection received for U.S. Appl. No. 12/118,647, dated Dec. 7, 2010, 29 pages.
Final Rejection received for U.S. Appl. No. 12/118,647, dated Mar. 9, 2012, 30 pages.
Non-Final Rejection received for U.S. Appl. No. 12/118,647, dated May 7, 2013, 38 pages.
Final Rejection received for U.S. Appl. No. 12/118,647, dated Dec. 27, 2013, 38 pages.
Non-Final Rejection received for U.S. Appl. No. 12/887,347, dated Apr. 1, 2011, 27 pages.
Final Rejection received for U.S. Appl. No. 12/887,347, dated Sep. 26, 2011, 23 pages.
Non-Final Rejection received for U.S. Appl. No. 12/887,347, dated Mar. 14, 2012, 28 pages.
Final Rejection received for U.S. Appl. No. 12/887,347, dated Aug. 31, 2012, 27 pages.
Non-Final Rejection received for U.S. Appl. No. 12/887,347, dated Aug. 29, 2016, 25 pages.
Final Rejection received for U.S. Appl. No. 12/887,347, dated Mar. 30, 2017, 24 pages.
Notice of Allowance received for U.S. Appl. No. 12/887,347, dated Feb. 9, 2018, 32 pages.
Non-Final Rejection received for U.S. Appl. No. 13/011,501, dated Feb. 27, 2012, 15 pages.
Final Rejection received for U.S. Appl. No. 13/011,501, dated Jul. 12, 2012, 13 pages.
Non-Final Rejection received for U.S. Appl. No. 13/011,501, dated Jan. 31, 2014, 12 pages.
Final Rejection received for U.S. Appl. No. 13/011,501, dated Sep. 9, 2014, 14 pages.
Non-Final Rejection received for U.S. Appl. No. 13/011,501, dated Jan. 15, 2015, 9 pages.
Final Rejection received for U.S. Appl. No. 13/011,501, dated Jul. 1, 2015, 15 pages.
Non-Final Rejection received for U.S. Appl. No. 13/011,501, dated Jan. 29, 2016, 14 pages.
Notice of Allowance received for U.S. Appl. No. 13/011,501, dated Aug. 5, 2016, 18 pages.
Notice of Allowance received for U.S. Appl. No. 13/011,501, dated Apr. 19, 2017, 23 pages.
Non-Final Rejection received for U.S. Appl. No. 13/011,536, dated Mar. 3, 2020, 18 pages.
Notice of Allowance received for U.S. Appl. No. 13/011,525, dated Mar. 12, 2020, 39 pages.
Notice of Allowance received for U.S. Appl. No. 15/681,298 dated Apr. 1, 2020, 16 pages.
Non-Final Rejection received for U.S. Appl. No. 12/118,646, dated Apr. 1, 2020, 22 pages.
Levitin, Adam J., "Payment Wars: The Merchant-Bank Struggle for Control of Payment Systems", Stanford Journal of Law, Business & Finance, vol. 12, No. 2, ProQuest Central, Spring, 2007, pp. 425-485.
International Search Report for application No. PCT/US09/143200 dated Jun. 16, 2009.
International Search Report for application No. PCT/US09/43161 dated Nov. 9, 2009.
Non-Final Rejection received for U.S. Appl. No. 12/118,646, dated Jun. 21, 2010, 31 pages.
Final Rejection received for U.S. Appl. No. 12/118,646, dated Dec. 7, 2010, 24 pages.
International Search Report for application No. PCT/US2010/049985 dated Nov. 17, 2010.
Final Rejection received for U.S. Appl. No. 12/118,643, dated Sep. 23, 2010, 17 pages.
Non-Final Rejection received for U.S. Appl. No. 12/118,647, dated Oct. 6, 2011, 22 pages.
Extended European Search Report for Application No. 09743702.4 dated Apr. 20, 2012.
Non-Final Rejection received for U.S. Appl. No. 12/118,646, dated Aug. 13, 2012, 30 pages.
Final Rejection received for U.S. Appl. No. 12/118,646, dated Mar. 5, 2013, 23 pages.
Extended European Search Report for Application No. 10819452 dated May 6, 2014.
Non-Final Rejection received for U.S. Appl. No. 12/118,646, dated Oct. 4, 2016, 36 pages.
Final Rejection received for U.S. Appl. No. 12/118,646, dated Apr. 27, 2017, 40 pages.
Non-Final Rejection received for U.S. Appl. No. 12/118,646, dated Nov. 3, 2017, 45 pages.
Final Rejection received for U.S. Appl. No. 12/118,646, dated Jun. 22, 2018, 40 pages.
Non-Final Rejection received for U.S. Appl. No. 12/118,646, dated Mar. 21, 2019, 33 pages.
Final Rejection received for U.S. Appl. No. 12/118,646, dated Sep. 30, 2019, 21 pages.
Extended European Search Report for application No. 11151777 dated May 25, 2011.
Non-Final Rejection received for U.S. Appl. No. 13/011,525, dated Apr. 18, 2012, 29 pages.
Final Rejection received for U.S. Appl. No. 13/011,525, dated Sep. 7, 2012, 47 pages.
Non-Final Rejection received for U.S. Appl. No. 13/011,525, dated Dec. 5, 2013, 68 pages.
Pollock, J., "Conditional Verbs," English Grammar and Teaching Strategies: Lifeline to Literacy, 1999, page 42.
"Sap Business One Glossary", SAP Business One 8.8, Jun. 2009, pp. 1-138.
"How to Manage Budgets", SAP Business One How-To Guide, SAP Business One 8.8, Dec. 2009, pp. 1-27.
Real, Loma, "SAP Business One in Action—The Difference Between Consolidation Options (Payment & Delivery) in the Business Partner Master Data", SAP Community Network, Dec. 2009, 17 pages.
"Finextra: Pay Pal launches teen account that lets parents track kids", spending, Retrieved on Nov. 27, 2013 from http://www.finextra.com/news/fullstory.aspx?newsitemid=20370, 3 pages.
Non-Final Rejection received for U.S. Appl. No. 13/011,525, dated Nov. 13, 2014, 41 pages.
Non-Final Rejection received for U.S. Appl. No. 13/011,525, dated Jul. 13, 2015, 18 pages.

(56) References Cited

OTHER PUBLICATIONS

Final Rejection received for U.S. Appl. No. 13/011,525, dated Oct. 22, 2015, 20 pages.
Notice of Allowance received for U.S. Appl. No. 13/011,501 dated Aug. 5, 2016, 8 pages.
Non-Final Rejection received for U.S. Appl. No. 13/011,525, dated Feb. 28, 2017, 19 pages.
Final Rejection received for U.S. Appl. No. 13/011,525, dated Jun. 14, 2017, 10 pages.
Non-Final Rejection received for U.S. Appl. No. 13/011,525, dated Apr. 5, 2018, 20 pages.
Final Rejection received for U.S. Appl. No. 13/011,525, dated Aug. 28, 2018, 25 pages.
Non-Final Rejection received for U.S. Appl. No. 13/011,525, dated Dec. 17, 2018, 24 pages.
Final Rejection received for U.S. Appl. No. 13/011,525, dated Apr. 8, 2019, 18 pages.
Notice of Allowance received for U.S. Appl. No. 13/011,525, dated Dec. 6, 2019, 26 pages.
Non-Final Rejection received for U.S. Appl. No. 15/681,298, dated Jun. 27, 2019, 26 pages.
Final Rejection received for U.S. Appl. No. 15/681,298, dated Jan. 8, 2020, 14 pages.
Extended European Search Report for application No. 11151776 dated Jul. 6, 2011.
Non-Final Rejection received for U.S. Appl. No. 13/011,536, dated Mar. 26, 2012, 43 pages.
Final Rejection received for U.S. Appl. No. 13/011,536, dated Sep. 11, 2012, 37 pages.
Notice of Allowance received for U.S. Appl. No. 12/118,646, dated Oct. 13, 2020, 11 pages.

\* cited by examiner

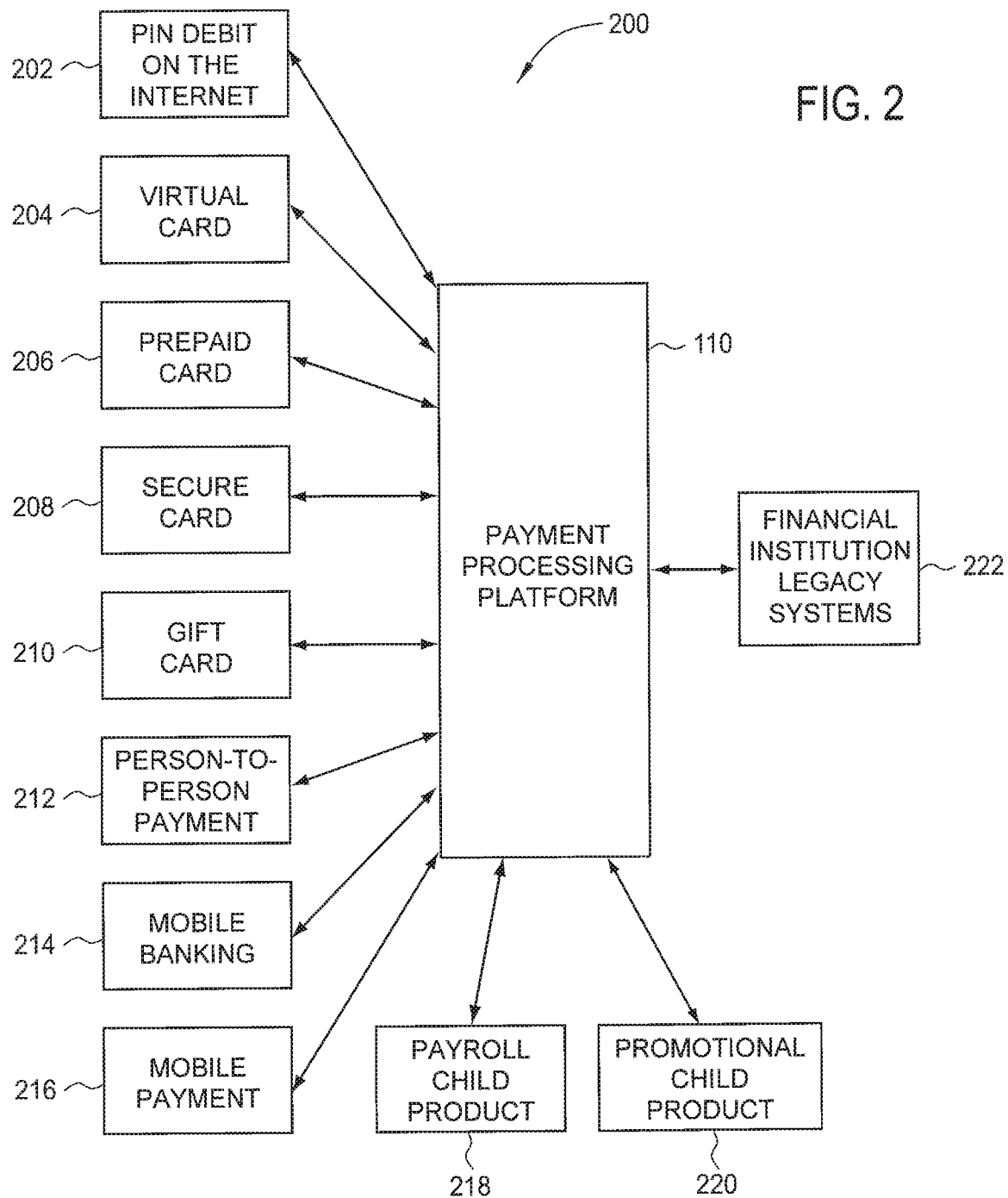

SYSTEM AND METHOD FOR DISTRIBUTED PAYMENT PRODUCTS

CROSS-REFERENCE TO RELATED APPLICATIONS

This application is a continuation of the co-pending U.S. patent application titled, "SYSTEM AND METHOD FOR DISTRIBUTED PAYMENT PRODUCTS," filed on Sep. 21, 2010 and having Ser. No. 12/887,347, which is a continuation-in-part of co-pending U.S. patent application titled, "PAYMENT PROCESSING PLATFORM", filed on May 9, 2008, and having Ser. No. 12/118,647, and also claims the priority benefit of U.S. Provisional Patent Application titled, "SYSTEM AND METHOD FOR DISTRIBUTED PAYMENT PRODUCTS", filed on Sep. 23, 2009, and having Ser. No. 61,245,213. The subject matter of these related applications is hereby incorporated herein by reference.

BACKGROUND

Field of the Various

The present invention relates generally to the field of payment processing and, more particularly, to a system and method for distributed payment products.

Description of the Related Art

As is known, several methods of payment for goods or services exist today, including cash, check, credit card, and debit card. Some of the most popular methods of payment include payment by credit card and by debit card. When credit/debit cards were first introduced, there was no concept of online payments, online banking, or payments via mobile phone. Today, these forms of payment are also very common.

A credit/debit card system is one where an issuer, usually a financial institution, issues a credit/debit card to a customer. The customer may then pay for goods or services using the credit/debit card. Essentially, the issuer is lending money to the customer to pay for the good or services.

When payment for goods or services is initiated with a credit/debit card, the transaction details are sent to a card network for processing. Each credit/debit card has a unique prefix that allows for proper routing of the transaction to the proper card network and to the proper financial institution. When the transaction is received by the financial institution, the transaction is processed and either approved or denied based on well-defined criteria.

However, existing payment products, including credit/debit cards, are premised on legacy systems that are difficult to change. For example, many financial institution systems use older generation software and mainframe computers. The rigidity of this legacy infrastructure, along with the large amount of information technology resources spent on compliance and maintenance, do not allow financial institutions to keep pace with payment technology advancements and customer demands.

For these reasons, other companies that are not traditional financial institutions, like Paypal®, which provides payment processing services, have been created to meet the market needs unmet by the financial institutions. These newer payment processing services pose a problem for financial institutions in that these services disintermediate customers from the financial institutions and take away revenue from the financial institutions.

Accordingly, there exists a need in the art for a payment processing platform that allows financial institutions to offer more sophisticated payment processing approaches with minimal changes to their legacy systems.

SUMMARY OF THE INVENTION

Embodiments of the invention provide a method and system for generating and distributing a plurality of financial child products to a group of recipients that can then be used for one or more payment transactions by each recipient. The method includes receiving a selection of a core account that provides financial backing for the plurality of financial child products and receiving a list of recipients that defines the group of recipients to which the financial child products are distributed. The method further includes generating the plurality of financial child products, where each financial child product is structured with one or more control parameters that define user restrictions for the financial child product, and causing one or more of the financial child products to be distributed to at least one recipient included in the list of recipients One advantage of the disclosed method and system is that they enable merchants and franchisors to more easily distribute promotional coupons to customers. Additionally, employees that do not hold bank accounts at a commercial bank can receive the full value of their salary via a payroll child product, without the need to pay check cashing fees at check-cashing locations.

BRIEF DESCRIPTION OF THE DRAWINGS

So that the manner in which the above recited features of the present invention are attained and can be understood in detail, a more particular description of the present invention, briefly summarized above, may be had by reference to the embodiments thereof which are illustrated in the appended drawings. It is to be noted, however, that the appended drawings illustrate only typical embodiments of the present invention and are therefore not to be considered limiting of its scope, for the present invention may admit to other equally effective embodiments.

FIG. 2 is a conceptual illustration of a system including a payment processing platform, according to one embodiment of the invention.

DETAILED DESCRIPTION

Figure 1:
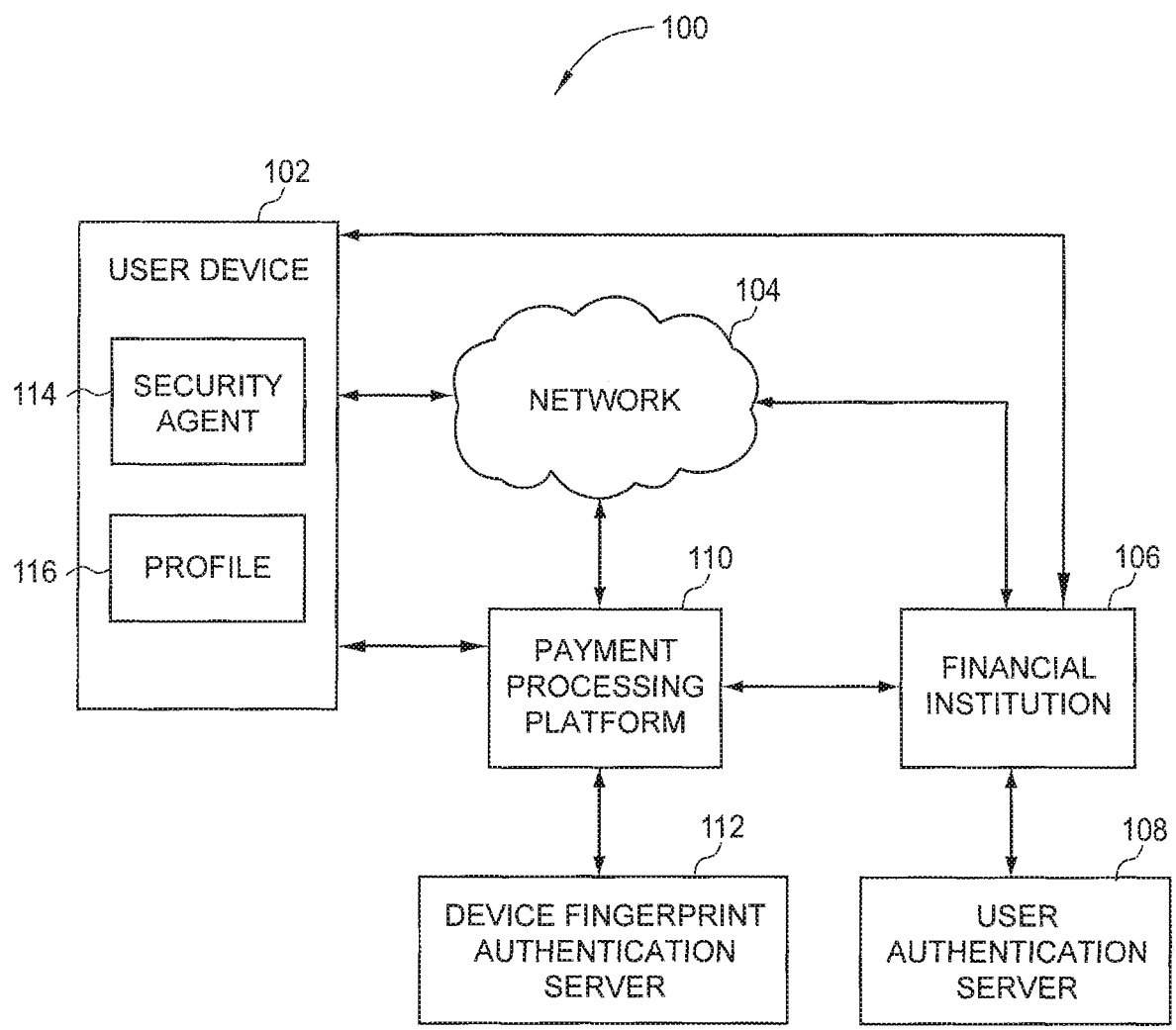
FIG. 1 is a block diagram illustrating components of a system configured to implement one or more aspects of the present invention.

FIG. 1 is a block diagram illustrating components of a system 100 configured to implement one or more aspects of the present invention. As shown, the system 100 includes a user device 102, a network 104, a financial institution 106, a user authentication server 108, a payment processing platform 110, and a device finger print authentication server 112.

The user device 102 may be any type of individual computing device such as, for example, a desktop computer, a laptop computer, a hand-held mobile device, a personal digital assistant, or the like. Alternatively, the user device 102 may be any other device, such as a standard telephone, or an ATM terminal for a financial institution, or a terminal used by a customer representative at a financial institution, or the like. In one embodiment, the user device 102 is configured to be in communication with the other components in the system 100 via the network 104. The network 104 may be any type of data network, such as a local area network (LAN), a wide area network (WAN), cellular communications network, the Internet, a voice network such as a standard telephone network, or the like.

As is described in greater detail below, a user may generate a "child product" that is linked to a "core account" held with a financial institution. In various embodiments, the core account may be any standard account held with a financial institution 106, including a checking account, a savings account, a home equity line of credit, a money market account, a credit card account, a healthcare savings account, an educational savings account, an employee benefits account, a promotion fund account, a rewards or loyalty program account, or the like. In other embodiments, the core account may be associated with any type of billed account, including a utility bill account, cable account, satellite television account, phone service account, cell phone account, or the like. The child product may be used to make payment transactions and the payment transactions may be processed as if the payment transactions were made using the core account. For example, a child product that is linked to a credit card core account is processed by the financial institution legacy system in the same manner as a regular credit card transaction. Additionally, the child product may be used to deliver promotional coupons and/or to pay a salary of employees. In further embodiments, control parameters may be added to the child product, restricting the usage of the child product, as described in greater detail below.

In one embodiment, when a user wishes to generate the child product, the user may direct the user device 102 to navigate to a webpage of the financial institution 106. In another embodiment, the user may use an ATM terminal at the financial institution to generate the child product. In yet another embodiment, the user may request the generation of a child product through a customer service representative at a branch location of the financial institution 106. In yet another embodiment, the user may request the generation of a child product through a customer service representative at a customer support call center of the financial institution 106. In still further embodiments, the user may request the generation of the child product directly from the payment processing platform 110. For example, the user may transmit one or more files to the payment processing platform 110 to indicate to the payment processing platform 110 to generate one or more child products.

As described in greater detail below, the user may need to authenticate with the financial institution 106 before the child product is generated. In one embodiment, authentication includes the user being prompted to enter a username and/or password. In alternate embodiments, the user may be prompted to swipe an ATM card and enter a PIN number to authenticate. In yet additional embodiments, the user may be asked to show a driver's license or a government-issued photo identification to authenticate with the financial institution 106. In still further embodiments, the user may place a telephone call to the financial institution customer service phone number to generate a child product. Authentication may involve the user being asked questions to verify the identity of the user. In alternative embodiments, a third-party other than a financial institution, may offer the ability to generate child products. In these embodiments, the user may be authenticated using any of the authentication methods described in relation to authenticating with a financial institution.

In another embodiment, to provide an additional layer of security, the user device 102 may include a security agent 114 and device profile 116. After the user has been authenticated with the financial institution 106, the payment processing platform 110 may prompt the security agent 114 installed on the user device 102 for the device profile 116 of the user device 102. The security agent 114 transmits the device profile 116 to the payment processing platform 110. The received device profile 116 is compared to data stored in the device finger print authentication server 112 that may include a listing of approved/authenticated user devices associated with each user. In one embodiment, each time that a user attempts to authenticate with a different user device 102, a confirmation code is sent to an email address for the user that the user enters before the user device is authenticated. In alternative embodiments, the confirmation code may be sent to the user via a Short Message Service (SMS), a text message, or via any other electronic means including by telephone. Once a particular user device 102 has been confirmed, the device profile 116 of the user device 102 is stored in the database of the device finger print authentication server 112. The next time the user attempts to authenticate using that particular user device 102, the device profile 116 of the user device is recognized by the device finger print authentication server 112 and the user is authenticated. Once the user is properly authenticated, the user may generate the child product.

FIG. 2 is a conceptual illustration of a system 200 including a payment processing platform 110, according to one embodiment of the invention. As shown, the payment processing platform 110 serves as an intermediary between various child products 202-220 and financial institution legacy systems 222. Child products may include a PIN debit child product 202, a virtual card child product 204, a prepaid card child product 206, a secure card child product 208, a gift card child product 210, a person-to-person payment child product 212, a mobile banking child product 214, a mobile payment child product 216, a payroll child product 218, or a promotional child product 220. One or more child products 202-220 are delivered to a recipient that may use the child products 202-220 to make a payment. In one embodiment, the recipient is the same individual as the user that generated the child product. In alternative embodiments, the recipient is different from the user that generated the child product.

As is known, in a debit transaction, a debit card or bank card is used to make a payment. The use of a debit card is functionally similar to writing a check, as the funds are withdrawn directly from the financial institution account of a customer. In a conventional PIN-debit card transaction at a physical merchant location, the customer may swipe or insert the debit card into a terminal and the transaction is authenticated by entering a personal identification number (PIN). However, PIN-debit transactions are not initiated on the Internet because customers are wary of entering their PIN number into a browser webpage for security reasons.

The PIN debit child product 202 allows for PIN debit transactions on the Internet. From a payment page of an online merchant, a user/customer may select a "Pay From My Financial Institution" payment option. At this point, the user/customer is authenticated through the financial institution's authentication server 108, as described above in FIG. 1. A virtual debit card number and a virtual PIN may be generated that are linked to the account of the user/customer held at the financial institution. The user/customer is able to initiate the online transaction as if the transaction was being made using a normal debit card. In this way, because the user/customer has already been authenticated with the financial institution through the financial institution's authentication server 108, the virtual PIN serves the same purpose as a real PIN from the merchant's perspective. In this way, the core account transaction is processed as a PIN debit transaction at the financial institution. In another embodiment, the payment processing platform receives a trigger from a merchant. In response, the payment processing platform transmits a listing of financial institutions offering the ability to generate child products to the merchant. A user/customer selects a financial institution from the listing and the user is authenticated through the financial institution's authentication server 108, as described above in FIG. 1

A virtual card child product 204 is a payment method for which non-physical manifestation of child card is generated. In some embodiments, a physical manifestation is also generated in addition to the non-physical virtual card. A user may create a virtual card child product 204 as a virtual credit or debit card, having a seemingly "normal" credit/debit card number, which can be used by the customer for card-not-present transactions such as online transaction, or mail-order telephone orders (MOTO) transactions. In alternative embodiments, a virtual card child product 204 may be generated and the card number may be associated with the contactless payment options enabled by a mobile device such as a radio-frequency identification (RFID) tag of a mobile device to allow a customer to make contactless payments at a point-of-sale location. In further embodiments, a virtual card child product 204 may be generated and the customer may print out an image of the virtual card child product, optionally including other identifying information such as a bar code, and take the print-out to a merchant location as a form of payment.

The prepaid card child product 206 may be generated with a preloaded balance. A user may load the prepaid card child product 206 with a limit that cannot be exceeded. Additional control parameters may include a per-transaction limit, or impose further restrictions, as described below. The prepaid card child product 206 may be a physical card, a virtual card, or both a physical card and a virtual card.

A secure card child product 208 is a payment method where child product is generated that is linked to a core account. In one embodiment, transaction made using the secure card child product 208 may be processed similar to transactions made using the core account. Additional control parameters may limit a per-transaction limit, or impose further restrictions, as described below. The secure card child product 208 may be a physical card, a virtual card, or both a physical card and a virtual card.

The gift card child product 210 is a payment method that may be given to another as a gift. The gift card child product 210 may be a physical card, a virtual card, or both a physical card and a virtual card. A gift card child product 210 is different from a prepaid card child product 206 since no funds are withdrawn/charged to the core account when a gift card child product 210 is generated. A gift card child product 210 may still include a limit; however, funds are only withdrawn/charged to the core account when transactions are initiated with the gift card child product 210. In other words, a portion of credit available in the core account is allocated for use by a recipient of the gift card child product 210. This differs from the prepaid card child product 206 which is generated with a pre-loaded balance.

The person-to-person payment child product 212 may be generated and used as a form of payment from one person/entity to another as a form of payment. In one embodiment, the person-to-person payment child product 212, like other child products, may be used to pay for goods or services in merchant transactions. In alternative embodiments, the person-to-person payment child product 212 may be converted to cash. The conversion may be a dollar-for-dollar conversion based on the card limits of the person-to-person payment child product 212, or may be some other ratio.

Mobile banking child products 214 and mobile payment child products 216 may be generated using a mobile device. Similarly, transactions made using other child products may be made with a mobile device.

The payroll child product 218 may be generated by an employer and distributed to employees as a form of salary payment. Each payroll child product 218 may be linked to the same core account (such as the employer's bank account) and may be distributed as a physical card and/or a virtual card. The payroll child product 218 may be generated having few, if any, control parameters that restrict the use of the payroll child product 218. The payroll child product 218 is a convenient mechanism for employers to distribute salaries and bonuses, and the payroll child product 218 provides flexibility to employees who do not have a checking or savings account at a commercial bank. Once distributed, the payroll child product 218 may be used to initiate one or more child transactions at various merchant locations, including payment transactions and/or redemption transactions. Redemption transactions are transactions that convert the payroll child product 218 into cash or initiate a deposit of an equivalent amount of funds into an account held by the recipient 802 at a financial institution. Redemption of the payroll child product 218 may occur through an ATM terminal, a commercial bank branch location, a check-cashing location, or any other mechanism. The payroll child products 218 may include few, if any, control parameters other than value of the child product to provide recipients 802 with maximum flexibility in how they use the funds linked to the payroll child product 218.

The promotional child product 220 may be generated by a merchant or franchisor and distributed to customers as a form of "coupon" or promotional discount. Promotional child products 220 can be mass-distributed to multiple customers, where each promotional child product 220 is linked to the same core account. Each promotional child product 220 may include the same values for the control parameters, such as expiration date, coupon value, and geographic region where the promotional child product 220 may be redeemed. In alternative embodiments, the control parameters (e.g., the value of the promotional child product 220) may vary for different customers based on certain criteria. For example, a franchisor may generate promotional child products 220 providing a $5.00 discount on purchases for customers in California, but the franchisor may generate promotional child product 220 providing a $3.00 discount on purchases for customers in Arizona for the same promotion. The promotional child product 220 may be delivered to the customers by the payment processing platform 110 via text message, email, physical card, virtual card, and/or any other technically feasible medium.

Figure 3A:
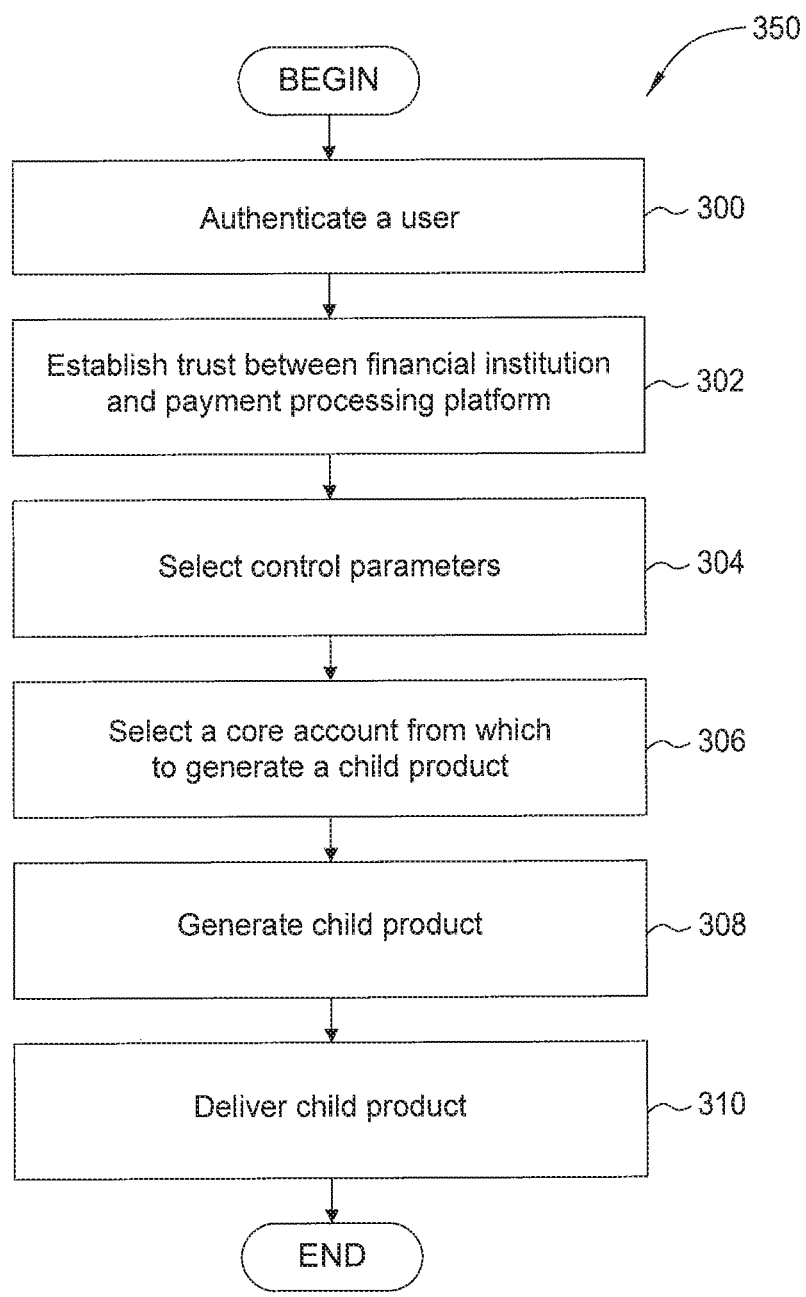
FIG. 3A is a flow diagram of method steps for generating a child product, according to one embodiment of the invention.

FIG. 3A is a flow diagram of method steps for generating a child product, according to one embodiment of the invention. Persons skilled in the art will understand that, even though the method 350 is described in conjunction with the systems of FIGS. 1 and 2, any system configured to perform the steps of the method 350 illustrated in FIG. 3A, in any order, is within the scope of the present invention.

As shown, the method 350 begins at step 300, where a user is authenticated. In one embodiment, the user may be authenticated by entering a username and password into a log-on screen of a financial institution website. In alternative embodiments, a third-party other than a financial institution may offer the ability to generate child products. In these embodiments, the user may be authenticated by entering a username and password into a log-on screen of the third-party website. In yet further embodiments, the device with which the user is attempting to authenticate himself is verified by comparing a device profile for the user device against a database of user devices previously registered by the user, as described in reference to FIG. 1.

In alternate embodiments, the user may be prompted to swipe an ATM card and enter a PIN number to authenticate. In yet additional embodiments, the user may be asked to show a driver's license or a government-issued photo identification to authenticate with the financial institution 106. In still further embodiments, the user may place a telephone call to the financial institution customer service phone number to generate a child product. Authentication may involve the user being asked questions to verify the identity of the user. For example, the user may be asked to verify a social security number and/or mother's maiden name. In yet other embodiments, the user may be authenticated using biometric characteristics.

Once the user is properly authenticated, the method 350 proceeds to step 302, where a trust is established between the financial institution 106 and the payment processing platform 110. In another embodiment, at step 302, a trust is established between a third party, other than a financial institution, that may be responsible for authentication and the payment processing platform 110. One embodiment of step 302 is described in greater detail in FIG. 3B.

Figure 3B:
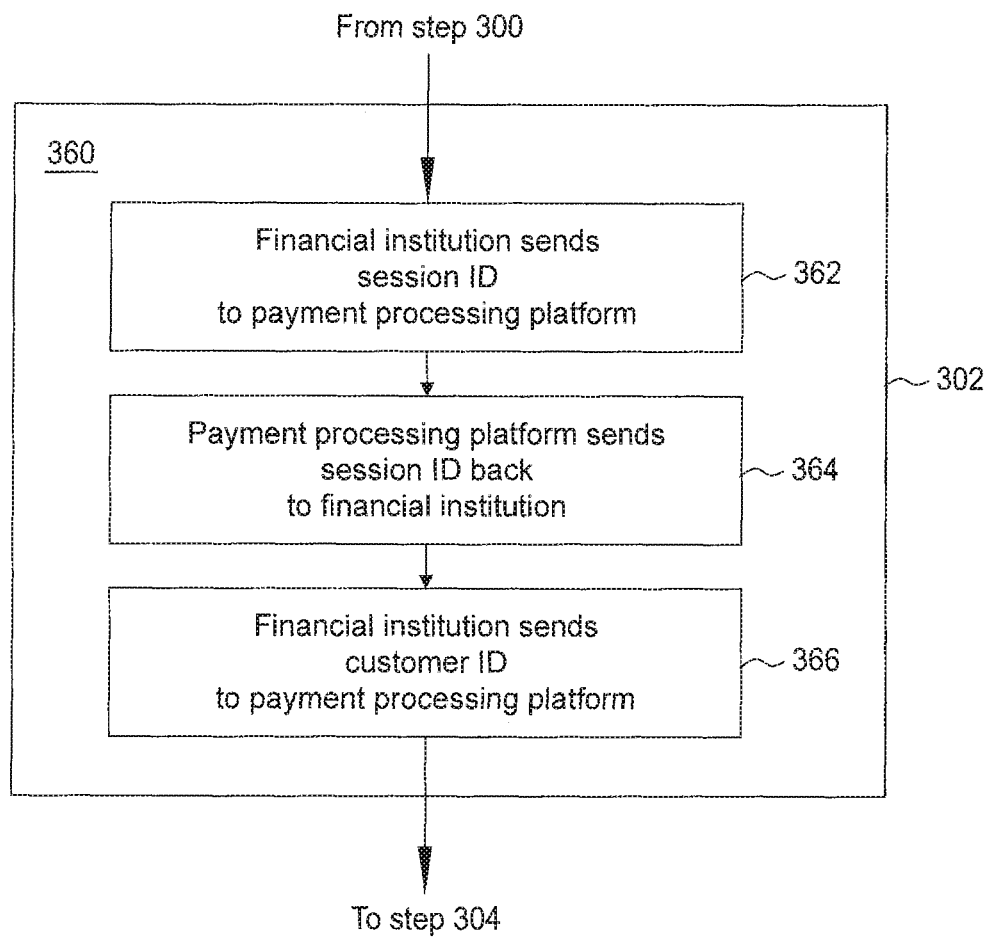
FIG. 3B is flow diagram of method steps for establishing trust between a financial institution and a payment processing platform, according to one embodiment of the invention.

FIG. 3B is flow diagram of method steps for establishing trust between a financial institution 106 and a payment processing platform 110, according to one embodiment of the invention. Persons skilled in the art will understand that, even though the method 360 is described in conjunction with the systems of FIGS. 1 and 2, any system configured to perform the steps of the method 360 illustrated in FIG. 3B, in any order, is within the scope of the present invention.

As shown, the method 360 begins at step 362, where the financial institution 106 sends a session identifier (session ID) to the payment processing platform 110 to begin the trust establishment process. Next, at step 364, the payment processing platform 110 sends the session ID back to the financial institution 106 through a back door to verify that the financial institution 106 had indeed sent that session ID, rather than a hacker, for instance. It should be noted that the exchange of the session ID is not the only means of establishing trust between the systems 106, 110; rather, trust may be established by any means known in the art without departing from the principles of the present invention. Then, at step 366, the financial institution 106 sends a customer identifier (customer ID) to the payment processing platform 110. In one embodiment, within the servers of the payment processing platform 110, the customer ID may be used to translate from a child product card number to a "real" account number, as described in greater detail below.

Referring back to FIG. 3A, at step 304, control parameters are selected. In one embodiment, control parameters include a series of restrictions on transactions made with the child product. For example, the control parameters may include, but are not limited to, a card spending limit, a per-transaction spending limit, a limit on number of transactions in a given period of time, a name on card, an activation date, an expiration date, a country of use, a merchant of use, a merchant category, a time of day, a day of week, a date of month, a merchant channel (online, point-of-sale), a reset frequency for reset-able cards, and the like.

When a child product is attempted to be used in a transaction, the transaction details may be checked against the control parameters stored for the child product. In one embodiment, if at least one of the control parameters is not satisfied, then the transaction is rejected. If each of the control parameters match those stored for the child product, the transaction is processed, as described in greater detail below in FIGS. 6 and 7. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per-transaction limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product to determine a match may be available.

Figure 4:
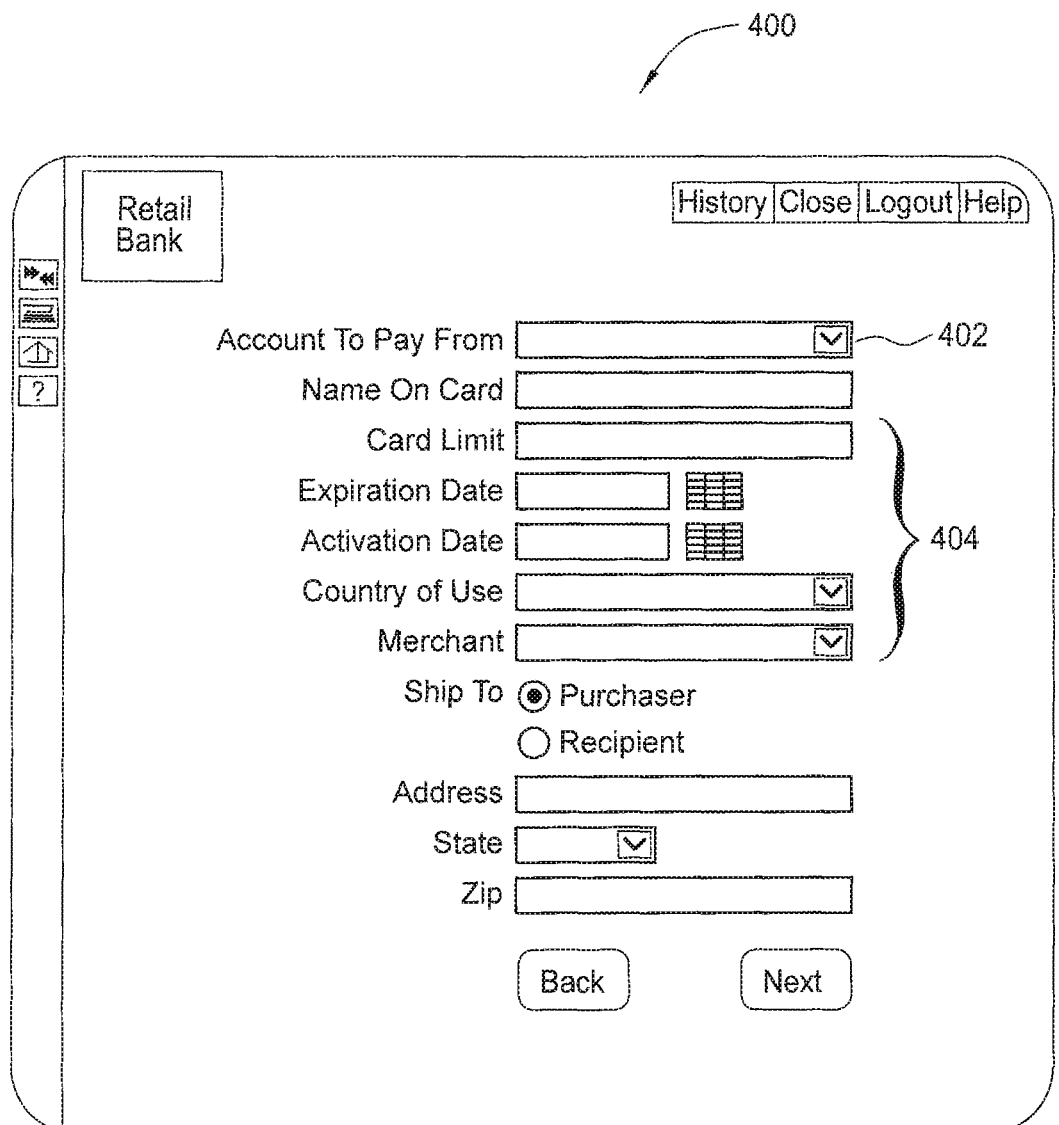
FIG. 4 is a screen shot illustrating selection of control parameters for a child product, according to one embodiment of the invention.

FIG. 4 is a screen shot 400 illustrating selection of control parameters 404 for a child product, according to one embodiment of the invention. In one embodiment, the selection of the core account 402 may be included in a single screen with the selection of the control parameters 404. As shown, the control parameters include card limit, expiration date, activation date, country of use, and merchant of use. As one having ordinary skill in the art will appreciate, additional control parameters may be selected for the child product, including merchant category (e.g., "restaurants"). For convenience, each child card may be given a name to remind a user of the purpose of a child card.

Referring back to FIG. 3A, at step 306, a core account is selected from which to generate a child product. In one embodiment, the core account may be any type of financial account held with a financial institution. For example, the core account may be a checking, savings, home equity, credit card account, or the like. When a child product is generated from a core account, any transactions made using the child product are processed as though the transaction was made using the core account, as is described in greater detail below.

At step 308, a child product is generated. In one embodiment, the child product is generated having a 16-digit card number, a card identification value, an expiration date, and a name on card. As is known, a card number includes a Bank Identification Number or BIN number. The BIN number is generally a one- to six-digit number that identifies the financial institution that issued the credit/debit card. In one embodiment of the invention, the child product generated at step 308 includes a BIN number that identifies that the child product as being issued by the payment processing platform 110. In alternative embodiments, the generated child card may include a BIN number within a range that identifies that the child product is associated with a particular financial institution, but is nevertheless a child product. In still further embodiments, depending on the category of the selected core account, the financial institution may request that the payment processing platform issue a child product of a particular type. For example, if the user selects a credit card account as the core account, then the generated child product may include a BIN number that identifies that child card as being a credit card that is processed through a particular credit card network.

Figure 5:
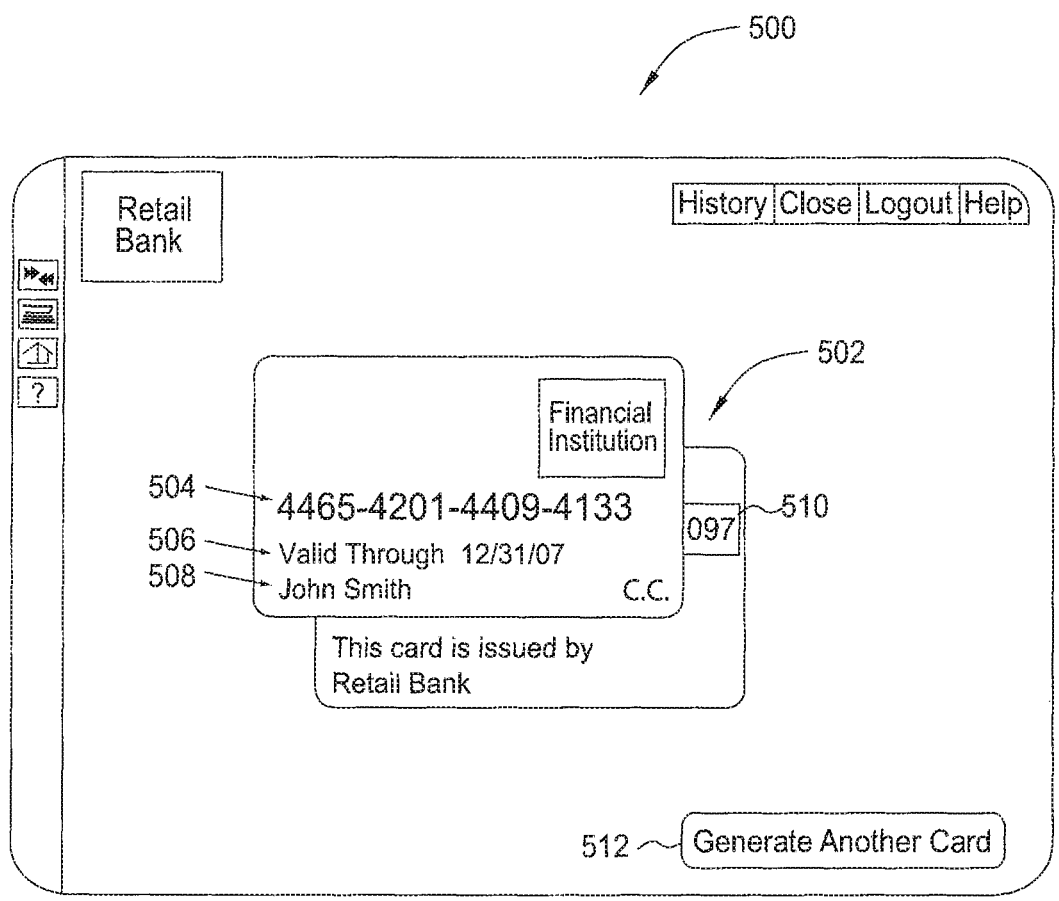
FIG. 5 is a screen shot illustrating a generated child product, according to one embodiment of the invention.

FIG. 5 is a screen shot 500 illustrating a generated child product 502, according to one embodiment of the invention. As shown, the child product 502 includes a card number 504, expiration date 506, name 508, and card identification value 510. As described above, a physical card may be requested and mailed to the address input when generating the child product 502. Alternatively, the child product 502 may be delivered electronically as a virtual card, or the child product 502 may be delivered both physically and electronically. The child product 502 can be used at a physical merchant or at a card-not-present merchant, such as online merchants, or mail-order telephone orders (MOTO) merchants, or any other place where a card is accepted as a payment instrument. In one embodiment, a virtual card may be generated and the card number may be associated with the contactless mobile payment solution such as a radio-frequency identification (RFID) tag of a mobile device to allow a user to make contactless payments at a point-of-sale location. In further embodiments, a virtual card may be generated and the user may print out an image of the virtual card child product, optionally including other identifying information such as a bar code, and take the print-out to a merchant location as a form of payment. In one embodiment, the card identification value is a Card Verification Value, like CVV, CVV2, PIN number, or any other card identification value.

Referring back to FIG. 3A, at step 310 the child product is delivered to the customer. In one embodiment, the child product may be a physical card that is mailed to the customer or to the recipient. In alternative embodiments, the child product may be a virtual card that is available to the customer/recipient through a web browser. Alternatively, the child product may be a virtual card that is emailed to the customer/recipient, sent using a SMS, sent using any electronics medium, and/or delivered over the phone. As described above, both the physical card and/or the virtual card may be used at physical point-of-sale merchant locations as well as for card-not-present transactions, such as online transactions, MOTO transactions, among others.

Figure 6:
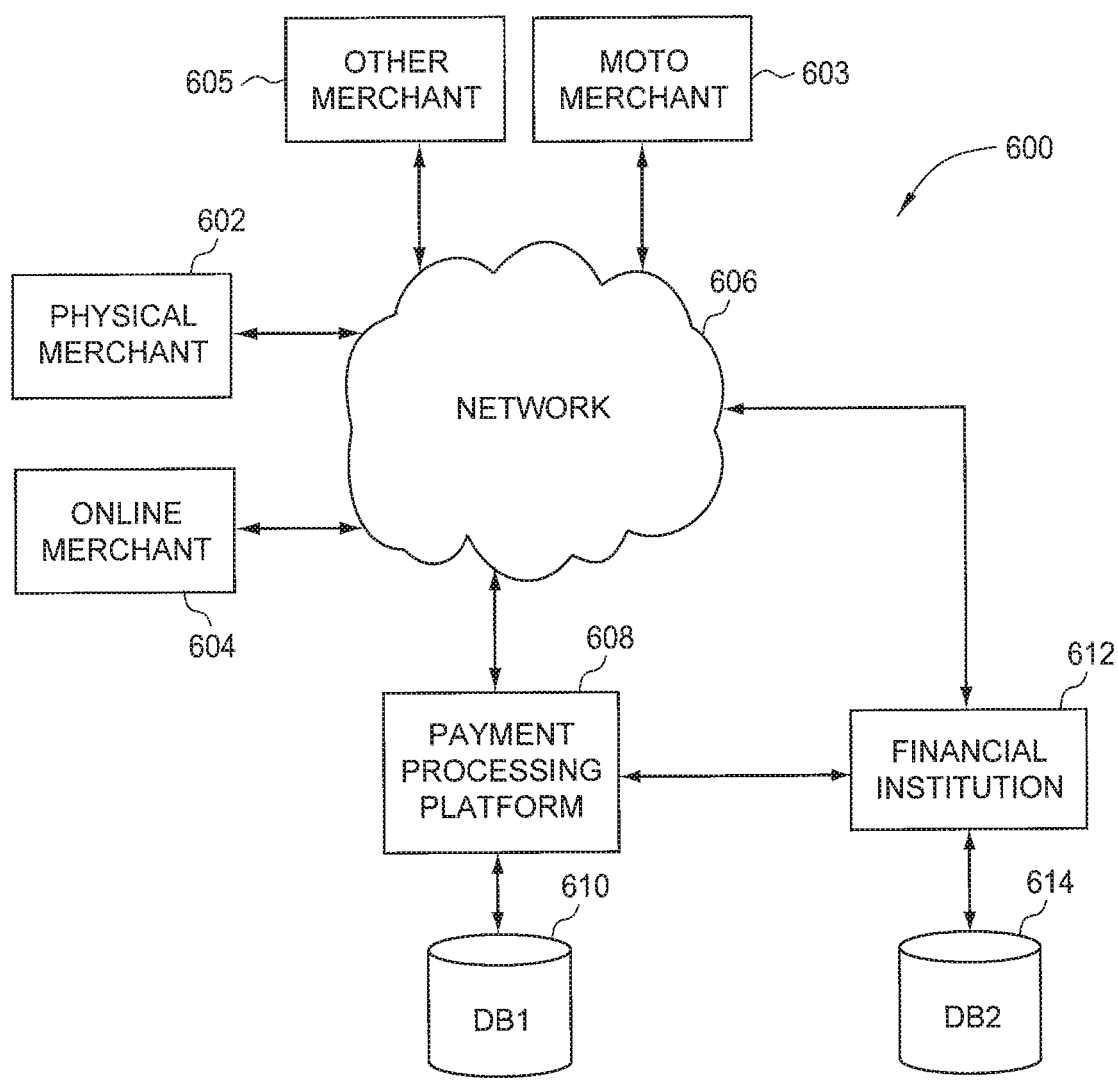
FIG. 6 is a block diagram illustrating components of a system configured to process a child transaction and a core account transaction, according to embodiments of the invention.

FIG. 6 is a block diagram illustrating components of a system 600 configured to process a child transaction and a core account transaction, according to embodiments of the invention. As shown, the system 600 includes the physical merchant 602, mail-order telephone orders (MOTO) merchant 603, online merchant 604, other merchant 605, a network 606, a payment processing platform 608, a first database 610, a financial institution 612, and a second database 614.

In one embodiment, a transaction initiated with a child product is known as a "child transaction." As described above, a child product may be delivered in the form of a physical card mailed to a customer or to a recipient. Alternatively, the child product may be delivered electronically as a virtual card. Alternatively, the child product may be delivered both physically as a physical card and electronically as a virtual card. Both the physical card child product and the virtual child card product may be used at any physical merchant 602, MOTO merchant 603, online merchant 604, or other merchant 605 that accepts regular credit/debit cards.

A child transaction may be initiated at the physical merchant 602. For example, a cashier at the physical merchant 602 may swipe the physical child product through a card reader. Alternatively, a child product may be delivered virtually on a user's mobile device and a user at the physical merchant 602 may wave his/her mobile device in front of a contact-less card reader. In still further embodiments, the customer may show his/her mobile device to a cashier at the merchant location who manually enters the card number of the child product.

In one embodiment, the network 606 is a card network. In alternative embodiments, the network 606 is an electronic funds transfer (EFT) network or a private network. For example, the child product may be a credit card child product, in which case child transaction information is sent to the appropriate credit card network. Similarly, the child product may be a signature debit card child product, in which case the child transaction information is sent to the appropriate debit card network. In other embodiments, the child product may be a PIN debit card, in which case the child transaction information is sent to the appropriate EFT network. Additionally, the child product may be a special card, in which case the child transaction information is sent to the appropriate private network.

In one embodiment, when a child transaction is received by the network 606 and identified as having a BIN number in the range associated with the payment processing platform 608 that issued the child product, then the child transaction is routed to the payment processing platform 608. In another embodiment, when a child transaction is received by the network 606 and identified as having a special BIN number in the range associated with a financial institution of the core account, then the child transaction is routed to the payment processing platform 608. In still further embodiments, when a child transaction is received by the network 606 and identified as having a BIN number in the range associated with a child product, then the child transaction may be routed to the financial institution 612, which, in turn, routes the child transaction to the payment processing platform 608.

When a child transaction is received by the payment processing platform 608, the payment processing platform 608 may then compare the child transaction details with control parameters stored for that particular child product in the first database 610. As described above, the comparison may require that each control parameter stored for the child product is satisfied, that a minimum number of control parameters are satisfied, or that a sum of the weights assigned to control parameters that are satisfied exceeds a minimum threshold. In one embodiment, if at least one of the control parameters is not satisfied, then the payment processing platform 608 may return a decline response to the network 606 and/or financial institution 612, and the child transaction is denied. If each of the control parameters is satisfied, then the card number of the child product is linked to the "real" account number of the core account to which the child product is linked. In one embodiment, the second database 614 contains the mapping from child product card numbers to core account numbers, and may be located on the systems of the financial institution 612. In alternative embodiments, the second database 614 may reside on systems operated by the payment processing platform 608. In still further embodiments, the first database 610 and the second database 614 may combined into a single database stored at the payment processing platform 608, at the financial institution 612, or at both the payment processing platform 608 and the financial institution 612. Once the core account number is determined, a core account transaction is generated and is transmitted to the network 606 for normal routing and processing as a core account transaction. The core account transaction is sent to the financial institution that issued the core account. The processing system at the financial institution that issued the core account processes the core account transaction in normal fashion and approves or denies the transaction based on a normal set of processing rules. In embodiments where the child transaction is transmitted from the financial institution 612 to the payment processing platform 608, the core account transaction generated by the payment processing platform 608 is transmitted to the financial institution 612, bypassing the network 606.

A similar child transaction may be initiated from an online merchant 604, from a MOTO merchant 603, or from any other merchant 605. In one embodiment, the user may input the child product card number into a payment webpage and an online child transaction is initiated. In another embodiment, the user may submit the child product card number to a customer service representative at a MOTO merchant 603. In yet another embodiment, the user may submit the child product card number in a mail order form to a MOTO merchant 603. A child transaction initiated at a MOTO merchant 603, at an online merchant 604, or at any other merchant 605 may be processed in similar fashion to a child transaction initiated at the physical merchant location 602.

Figure 7:
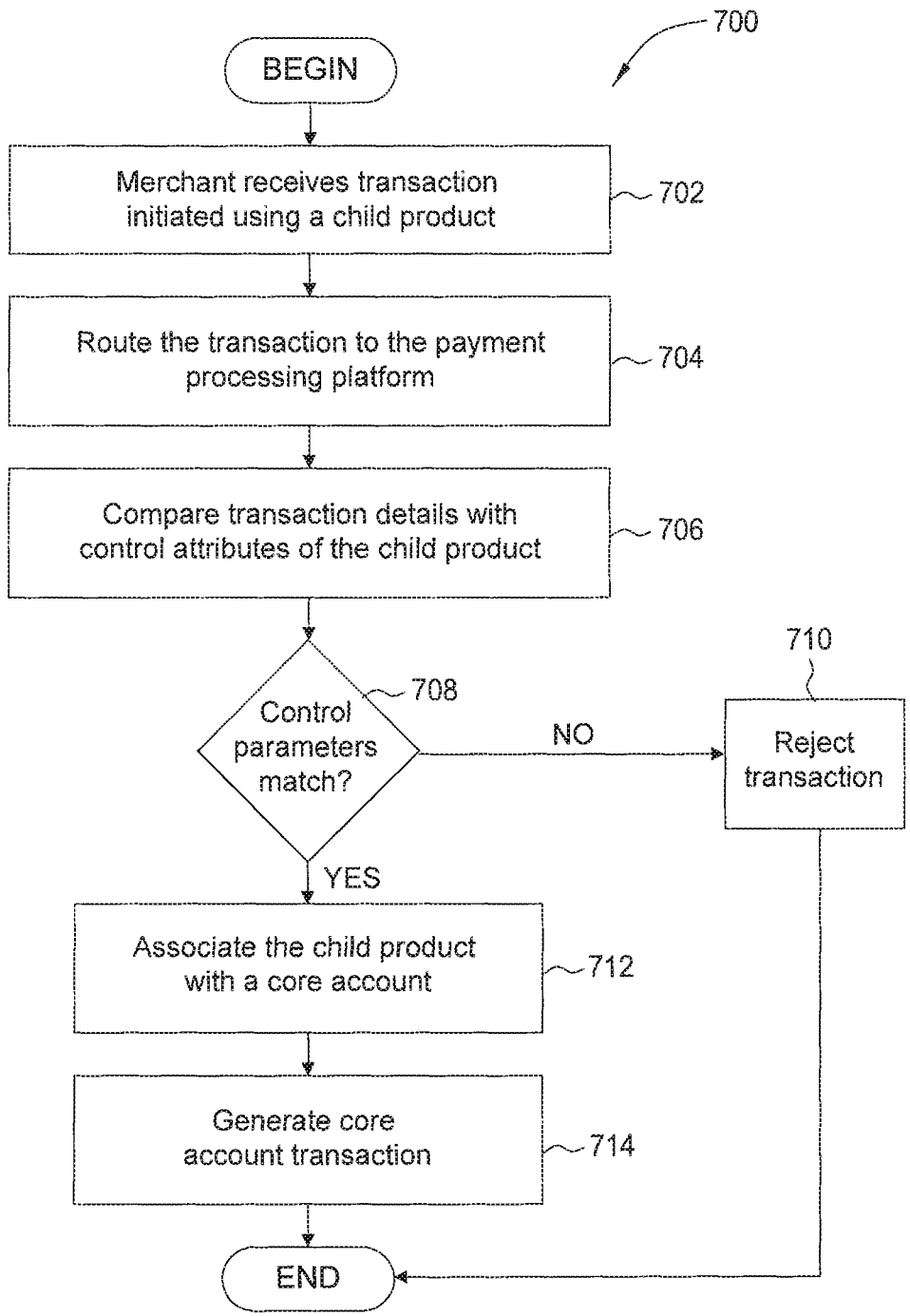
FIG. 7 is a flow diagram of method steps for processing the child transaction and the core account transaction, according to one embodiment of the invention.

FIG. 7 is a flow diagram of method steps for processing a child transaction and a core account transaction, according to one embodiment of the invention. Persons skilled in the art will understand that, even though the method 700 is described in conjunction with the systems of FIGS. 1, 2, and 6 any system configured to perform the steps of the method 700 illustrated in FIG. 7, in any order, is within the scope of the present invention.

As shown, the method 700 begins at step 702, where a merchant receives a child transaction initiated using a child product. In one embodiment, the merchant is a physical merchant and the child transaction is initiated by the child product (physical card) being swiped through a credit card reader or virtual card waved in front of a contactless card reader or virtual card read by a bar code reader, or merchant reading a card number from device or a print out. In alternative embodiments, the merchant is an online merchant, MOTO merchant, or other merchant that receives a child product card number that is input into a payment webpage of the online merchant website, over the phone, via a mail-order, or via any other means.

At step 704, the child transaction is routed to the payment processing platform that generated the child product. As described above, a child product includes a BIN number within a BIN number range that identifies the child product as such. In one embodiment, the child transaction is passed directly to the payment processing platform from the merchant, bypassing the network. In alternative embodiments, the child transaction is passed from the merchant to a network. In still further embodiments, the child transaction is passed from the merchant to the network and then to the financial institution, which, in turn, routes the child transaction to the payment processing platform. In yet further embodiments, the child transaction is passed from the merchant to the financial institution (bypassing the network), which, in turn, routes the child transaction to the payment processing platform.

As described, the child product may be a credit card, in which case the child transaction information is sent to the appropriate credit card network. Alternatively, the child product may be a signature debit card, in which case the child transaction information is sent to the appropriate debit card network. The child product may be a PIN debit card, in which case the child transaction information is sent to the appropriate EFT network. The child product may be a special card, in which case the child transaction information is sent to the appropriate private network. In yet further embodiments, the child transaction is processed through multiple networks before ultimately being routed to the payment processing platform. To the merchant, the child transaction may proceed as though the payment processing platform is the "issuer" of the child product with which the child transaction is initiated.

At step 706, the payment processing platform compares the child transaction details with control parameters of the child product. As described above, each child product is associated with a series of control parameters that are stored in a first database DB1, referenced by child product. When the child transaction is received by the payment processing platform, the child product card number may be used as a reference pointer to determine the associated control parameters stored in the first database DB1.

At step 708, if the control parameters of the child transaction do not match the control parameters stored in the first database DB1, then the child transaction is rejected, a denial is returned at step 710, and the method 700 terminates. In one embodiment, if the child transaction was routed from the merchant to the payment processing platform bypassing the network, then the denial is returned directly to the merchant. In alternative embodiments, if the child transaction was routed through a network to the payment processing platform, then the denial is returned to the network and routed to the merchant. In further embodiments, if the child transaction was routed to the payment processing platform from a financial institution, then the denial is returned to the financial institution.

As described above, the determination of whether the control parameters match at step 708 may require that each control parameter stored for the child product is satisfied, that a minimum number of control parameters are satisfied, or that a sum of the weights assigned to control parameters that are satisfied exceeds a minimum value. If at step 708 the control parameters match, then the method 700 proceeds to step 712.

At step 712, the child product is associated with a core account. As described above, a second database DB2 stores a mapping of the child product to the core account to which the child product is linked. In one embodiment, the second database DB2 resides on the financial institution system. In alternative embodiments, the second database DB2 resides within a system associated with the payment processing platform. In some embodiments, the second database DB2 is included in the first database DB1 that stores control parameters.

At step 714, a core account transaction is generated based on the core account number and other child transaction details. In one embodiment, the core account transaction is transmitted to the network for normal processing. For example, the financial institution that receives the core account transaction may view the core account transaction with the payment processing platform as being the "merchant" from which the transaction was initiated. In alternative embodiments, the core account transaction is transmitted directly to the financial institution from the payment processing platform, bypassing the network.

In one embodiment, when the core account transaction is received at the financial institution, the financial institution views the core account transaction as initiating from the payment processing platform as a merchant entity. Thus, the financial institution processes the core account transaction and transfers funds to the payment processing platform, which in turn transfers the funds to the original merchant. In alternative embodiments, the financial institution that receives the core account transaction can determine the original merchant is the payee, and the funds are transferred to the merchant, bypassing the payment processing platform. In this manner, a two-part transaction is completed. The child transaction, as described at step 702-706, is processed as though the payment processing platform is the "issuer" of the child product. Then, the core account transaction, as described at steps 712-714, is processed by the financial institution as though the payment processing platform is the "merchant" that initiated the core account transaction.

Figure 8:
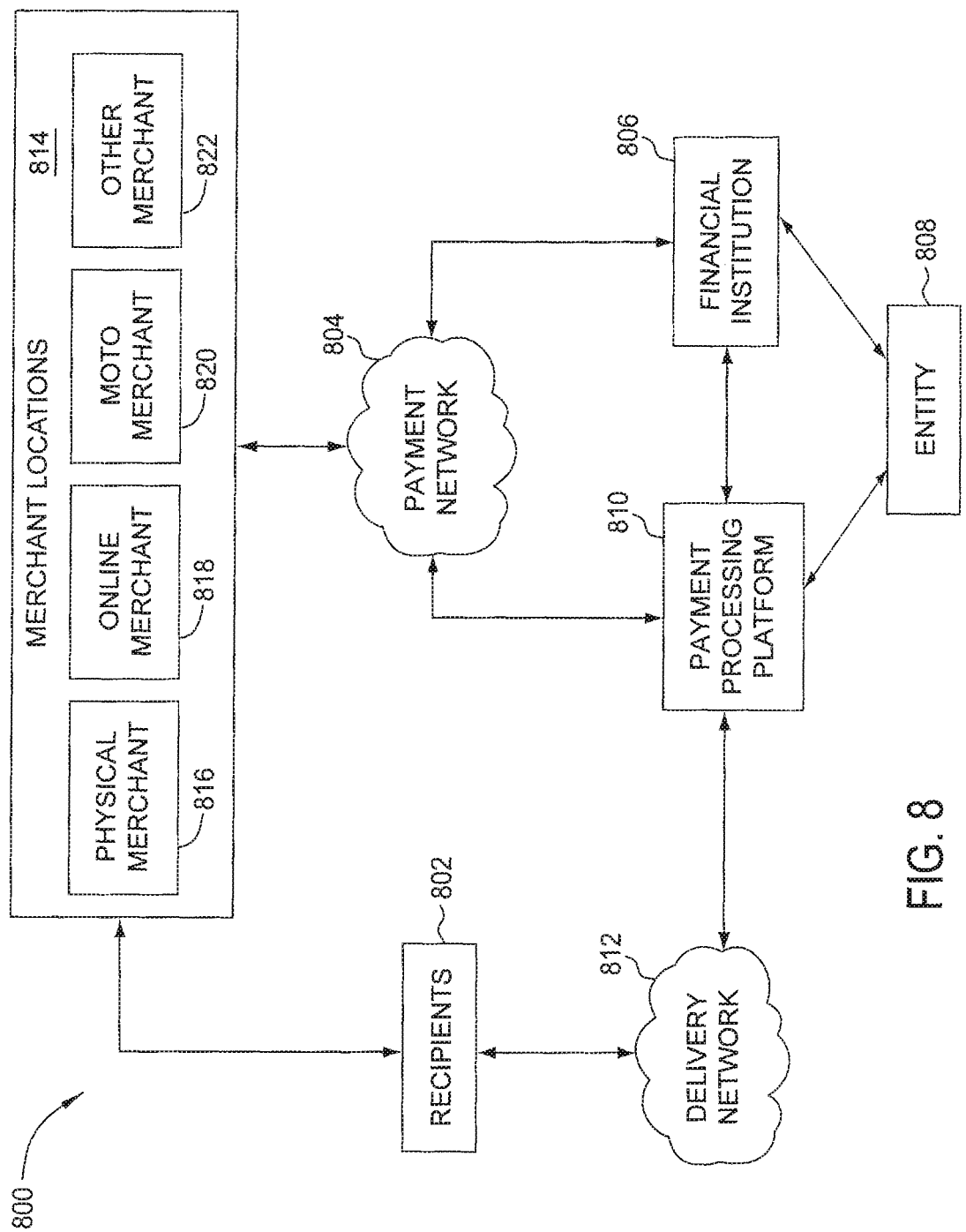
FIG. 8 is a block diagram illustrating components of a system configured for generating and mass-distributing child products, according to embodiments of the present invention.

FIG. 8 is a block diagram illustrating components of a system 800 configured for generating and mass-distributing child products, according to embodiments of the present invention. As shown, the system 800 includes recipients 802, a payment network 804, a financial institution 806, an entity 808, a payment processing platform 810, a delivery network 812, and merchant locations 814.

The entity 808 may generate child products via the payment processing platform 810, as described above in FIGS. 3A-3B, which are then delivered to the recipients 802 and can be redeemed at the merchant locations 814. The merchant locations 814 may be physical merchant locations 816, online merchant locations 818, mail-order telephone orders (MOTO) merchant locations 820, or other merchant locations 822. Other merchant locations 822 may include commercial bank branch locations, ATM terminals, or check-cashing locations, each of which comprises a merchant location where the recipient 802 may convert the value of the child product to cash or deposit the value of the child product into an account held at a financial institution. In one embodiment, the entity 808 is a franchisor, the merchant locations 814 are franchise locations, and the child product is a promotional child product 220. In alternative embodiments, the entity 808 may comprise the same entity as the merchant location 814. In still further embodiments, the entity 808 may be an employer, the recipient 802 may be an employee, and the child product may be a payroll child product 218.

The entity 808 holds a core account at the financial institution 806. In various embodiments, the core account may be any standard account held with the financial institution 806, including a checking account, a savings account, a home equity line of credit, a money market account, a credit card account, a healthcare savings account, an educational savings account, an employee benefits account, a promotion fund account, a reward or loyalty program account, a billed account, or the like.

In one embodiment, the child products (i.e., payroll child products 218) are distributed to the recipients 802 as a form of salary payment. An employer (i.e., entity 808) may pay salary to employees (i.e., recipients 802) via payroll child products 218. Payroll child products 218 may include different control parameters, such different dollar-amount values for the child product. For example, a first employee that is paid a $1000.00 weekly salary may receive a payroll child product 218 with a value control parameter of $1000.00; whereas, a second employee that is paid a $2000.00 weekly salary may receive a payroll child product 218 with a value control parameter of $2000.00. Once distributed, the payroll child product 218 may be used to initiate one or more child transactions at various merchant locations, including payment transactions and/or redemption transactions. Again, redemption transactions are transactions that convert the payroll child product 218 into cash or initiate a deposit of an equivalent amount of funds into an account held by the recipient 802 at a financial institution. The payroll child products 218 may include few, if any, control parameters other than value of the child product to provide recipients 802 with maximum flexibility in how they use the funds linked to the payroll child products 218.

In another embodiment, the child products (i.e., promotional child products 220) are distributed to the recipients 802 as promotional coupons that may be redeemed at the merchant locations 814. Each child product may be associated with a portion of the value of the core account. For example, if a franchisor (i.e., entity 808) wants to give members of a mailing list (i.e., recipients 802) coupons for $3.00 that can be redeemed at any franchise location (i.e., merchant locations 814), and the franchisor has $300,000.00 in a promotion fund account held at the financial institution 806, then the franchisor may generate 100,000 individual child products that may be distributed to 100,000 different recipients 802. The different child products can be structured, for example, so that they can be redeemed at any franchise location within a particular geographic region before a particular expiration date.

The entity 808 may provide one or more data files to the payment processing platform 810 that includes information associated with the different recipients 802 and specific instructions for distributing the child products. For example, the information may include names of the recipients, contact information, an amount associated with each recipient, which may be different for different recipients, control parameters associated with one or more recipients, core account information, or any other technically feasible type of information. Alternatively, the entity 808 may input this information into a webpage managed by the payment processing platform 810 that is configured to accept mass-distribution child card information specifying the different recipients 802 and the distribution instructions.

The payment processing platform 810 distributes the child products to the recipients 802 via the delivery network 812. As described, the child products may be in the form of virtual and/or physical child products, email child products, text message and/or SMS child products, printable child products, and the like. The delivery network 812 may be an email routing network, a cell phone network, a cable television network, a satellite network, a postal network, the Internet, a voice network such as a standard telephone network, or the like, depending on the form of the child product.

The recipient 802 can redeem the child product at the merchant locations 814. Redemption of the child product may cause the transaction to be a "split-tender" transaction, where a first portion of the payment is received via the child product and the remainder of the payment is received by standard payment methods, such as cash, check, charge, debit, and the like. When the child product is redeemed, the merchant location 814 initiates a "child transaction," through the payment network 804 to the payment processing platform 810, as described in FIGS. 6 and 7. The child transaction is received at the payment processing platform 810, where the payment processing platform 810 verifies the control parameters. If all of the control parameters are satisfied for the child transaction, the payment processing platform 810 causes a payment to be made from the financial institution 806 to the merchant location 814 using the core account.

In one embodiment, the funds remain in the core account held at the financial institution 806 until the child transaction is verified by the payment processing platform 810. For example, continuing with the example above of the franchisor that generates 100,000 promotional child products 220, each having a value of $3.00, the $300,000.00 in funds held in the core account remains in the core account and is distributed to the merchant locations 814 one-at-a-time for each promotional child product 220 that is redeemed at the merchant locations 814. In this fashion, the entity 808 holds the funds in the core account for a longer period of time, allowing the entity 808 to earn more interest when compared to prior art techniques.

Figure 9:
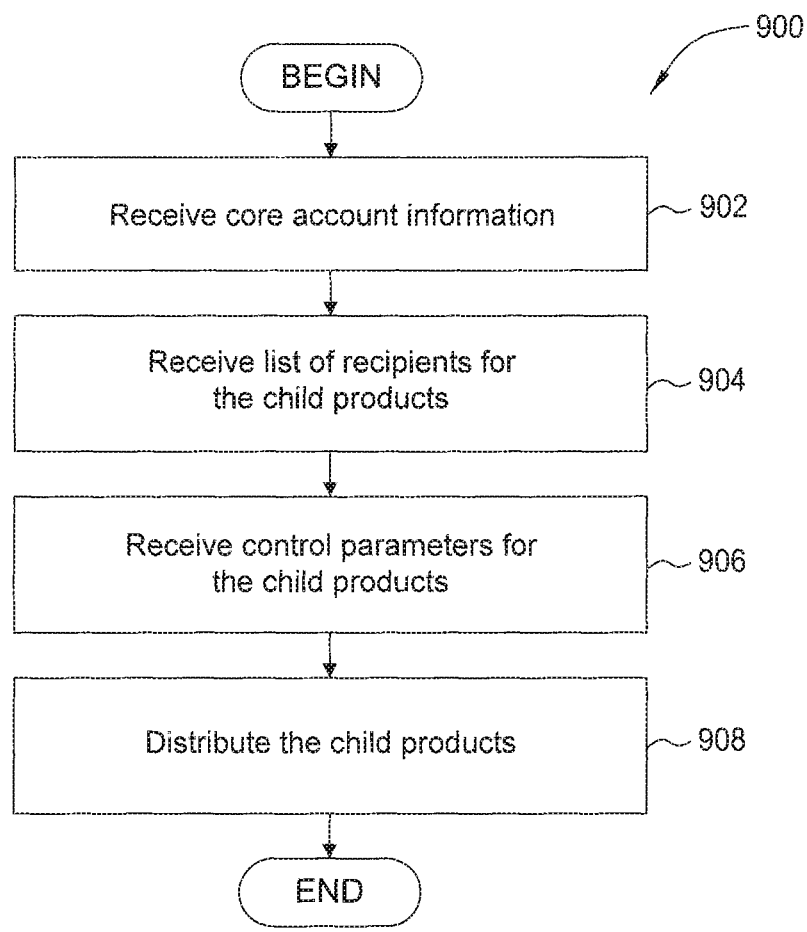
FIG. 9 is a flow diagram of method steps for mass generation and mass distribution of child products, according to embodiments of the present invention.

FIG. 9 is a flow diagram of method steps for mass generation and mass distribution of child products, according to embodiments of the present invention. Persons skilled in the art will understand that, even though the method 900 is described in conjunction with the systems of FIGS. 1, 2, 6, and 8, any system configured to perform the steps of the method 900 illustrated in FIG. 9, in any order, is within the scope of the present invention.

As shown, the method 900 begins at step 902, where the payment processing platform 810 receives information related to the core account held at the financial institution 806. In one embodiment, the entity 808 may provide the information related to the core account to the payment processing platform 810 in a data file delivered to the payment processing platform 810. In alternative embodiments, the entity 808 may input the core account information into a webpage managed by the payment processing platform 810 and configured to accept core account information for child product generation purposes.

At step 904, the payment processing platform 810 receives a list of recipients 802 to receive the child product. The list provides contact information for the recipients 802, such an email address, a cell phone number, a postal address, a customer number, an employee identification number, a social security number, and the like. The contact information is used by the payment processing platform 810 to deliver the child products, once the child products are generated.

At step 906, the payment processing platform 810 receives control parameters for the child products to be generated. In one embodiment, the control parameters are the same for each of the mass-distributed child products. For example, when the child products are promotional child products 220, each child product may have identical control parameters, including identical value. In alternative embodiments, the control parameters vary based on the recipient of the child product or other criteria. For example, when the child products are payroll child products 218, each payroll child product may have a different value based on the salary of each individual employee.

At step 908, the payment processing platform 810 distributes the child products via the delivery network 812. Various delivery networks 812 are contemplated, including, but not limited to, an email routing network, a cell phone network, a cable television network, a satellite network, a postal network, the Internet, a voice network such as a standard telephone network, or the like, or any combination of different delivery networks 812.

The recipient 802 may then redeem the child product at a merchant location. A two-part transaction, which includes a child transaction and a core account transaction, is initiated between the merchant 814, the payment processing platform 810, and/or the financial institution 806 via the payment network 804, as described in greater detail in FIG. 7.

One advantage of certain embodiments of the invention is that employees who do not have a checking or savings account at a commercial bank are provided with greater flexibility when receiving salary payments. These employees can receive the full value of their salary without having to pay fees to have checks cashed at check-cashing locations. Additionally, since the funds used to support employees' salary remains in the core account of the employer until the associated payroll child products are redeemed, the employer is able to earn more interest on the funds in the core account.

Another advantage is that merchants/franchisors can more easily distribute and control the distribution of promotional coupons to customers. Similar to employers that issue salary child products, merchants/franchisors keep more funds in their core account for longer periods of time, allowing more interest to accrue. From the financial institution's perspective, more funds are held at the financial institution for longer periods of time, allowing the financial institution to take advantage of various lending or investment opportunities using these funds.

Finally, since creating, distributing, and redeeming of payroll child products and promotional child products can be performed using existing legacy networks, financial institutions only need to minimally modify legacy payment processing infrastructure.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method, comprising:
   receiving, by a payment processing platform entity that is separate and distinct from a financial institution entity, a selection of at least one core account that provides financial backing for a first financial child product;
   receiving, by the payment processing platform entity, a list of recipients that defines a group of recipients including a first recipient to which the first financial child product is to be distributed;
   generating, via a processor included in the payment processing platform entity, the first financial child product, wherein the first financial child product is structured with one or more restrictions for the first financial child product; and
   causing the first financial child product to be distributed to the first recipient,
   wherein the payment processing platform entity receives a first payment transaction that is initiated using the first financial child product and, in response, generates a second payment transaction for output to the financial institution entity that includes information specific to the at least one core account.

2. The computer-implemented method of claim 1, wherein the first financial child product comprises a mobile child product stored on a mobile device.

3. The computer-implemented method of claim 2, wherein the first financial child product comprises a virtual card child product.

4. The computer-implemented method of claim 3, wherein causing the first financial child product to be distributed comprises electronically transmitting the virtual card child product to the first recipient.

5. The computer-implemented method of claim 4, wherein a merchant entity receives the virtual card child product and sends the first payment transaction to the payment processing platform entity.

6. The computer-implemented method of claim 1, further comprising:
   generating, via a processor included in the payment processing platform entity, a second financial child product, wherein the second financial child product is structured with one or more restrictions for the second financial child product; and
   causing the second financial child product to be distributed to a second recipient included in the group of recipients.

7. The computer-implemented method of claim 1, wherein a first user that is separate and distinct from the first recipient transmits the selection of the at least one core account.

8. A non-transitory computer-readable medium storing instructions that, when executed by a processor at the payment processing platform entity, cause the payment processing platform entity to perform the steps of:
   receiving, by a payment processing platform entity that is separate and distinct from a financial institution entity, a selection of at least one core account that provides financial backing for a first financial child product;
   receiving, by the payment processing platform entity, a list of recipients that defines a group of recipients including a first recipient to which the first financial child product is to be distributed;
   generating, via a processor included in the payment processing platform entity, the first financial child product, wherein the first financial child product is structured with one or more restrictions for the first financial child product; and
   causing the first financial child product to be distributed to the first recipient,
   wherein the payment processing platform entity receives, from a merchant entity, a first payment transaction that is initiated using the first financial child product and, in response, generates a second payment transaction for output to the financial institution entity that includes information specific to the at least one core account.

9. The non-transitory computer-readable medium of claim 8, wherein the first financial child product comprises a mobile child product stored on a mobile device.

10. The non-transitory computer-readable medium of claim 9, wherein the first financial child product comprises a virtual card child product.

11. The non-transitory computer-readable medium of claim 10, wherein causing the first financial child product to be distributed comprises electronically transmitting the virtual card child product to the first recipient.

12. The non-transitory computer-readable medium of claim 11, wherein a merchant entity receives the virtual card child product and sends the first payment transaction to the payment processing platform.

13. The non-transitory computer-readable medium of claim 8, wherein a first restriction for the first financial child product comprises one of:
   a country of use parameter;
   a merchant parameter; or
   a merchant category parameter.

14. The non-transitory computer-readable medium of claim 8, wherein the first financial child product includes a bank identification number (BIN) that is based on an account type associated with the at least one core account.

15. A system, comprising:
   a processor; and
   a memory storing a program that, when executed by the processor, is configured to:
      receive, by a payment processing platform entity that is separate and distinct from a financial institution entity, a selection of at least one core account that provides financial backing for a first financial child product;
      receive, by the payment processing platform entity, a list of recipients that defines a group of recipients including a first recipient to which the first financial child product is to be distributed;
      generate, by a processor included in the payment processing platform entity, the first financial child product, wherein the first financial child product is structured with one or more restrictions for the first financial child product; and cause the first financial child product to be distributed to the first recipient, wherein the payment processing platform entity receives a first payment transaction that is initiated using the first financial child product and, in response, generates a second payment transaction for output to the financial institution entity that includes information specific to the at least one core account.

16. The system of claim 15, wherein the first financial child product comprises a mobile child product stored on a mobile device.

17. The system of claim 16, wherein causing the first financial child product to be distributed comprises electronically transmitting the mobile child product to the first recipient.

18. The system of claim 16, wherein a merchant entity receives the mobile card child product and sends the first payment transaction to the payment processing platform.

19. The system of claim 16, wherein a merchant entity electronically receives the mobile child card product from the mobile device and sends the first payment transaction to the payment processing platform.

20. The system of claim 15, wherein the payment processing platform entity causes the first financial child product to be distributed to the first recipient via a first network and the payment processing platform receives the first payment transaction via a second network.

* * * * *

UNITED STATES PATENT AND TRADEMARK OFFICE
CERTIFICATE OF CORRECTION

PATENT NO. : 10,915,880 B2
APPLICATION NO. : 15/960223
DATED : February 9, 2021
INVENTOR(S) : Rajesh G. Shakkarwar Page 1 of 1

It is certified that error appears in the above-identified patent and that said Letters Patent is hereby corrected as shown below:

On the Title Page

(56) References Cited, Page 3, Column 2, Lines 63-65, Please delete "Real, Loma, "SAP Business One in Action—The Difference Between Consolidation Options (Payment & Delivery) in the Business Partner Master Data", SAP Community Network, Dec. 2009, 17 pages." and insert --Real, Lorna, "SAP Business One in Action -The Difference Between Consolidation Options (Payment & Delivery) in the Business Partner Master Data", SAP Community Network, Dec. 2009, 17 pages.--.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*